United States Patent [19]

Malloy et al.

[11] Patent Number: 5,091,962

[45] Date of Patent: * Feb. 25, 1992

[54] METHOD AND APPARATUS FOR DETECTING A SHEET STRIP MATERIAL MISFEED CONDITION

[75] Inventors: Joseph P. Malloy, Freeport; William Baldwin, Verona, both of Pa.

[73] Assignee: Oberg Industries, Inc., Freeport, Pa.

[*] Notice: The portion of the term of this patent subsequent to Mar. 21, 2006 has been disclaimed.

[21] Appl. No.: 283,175

[22] Filed: Dec. 9, 1988

Related U.S. Application Data

[63] Continuation of Ser. No. 84,630, Aug. 11, 1987, Pat. No. 4,813,320.

[51] Int. Cl.$^5$ .................. G06K 9/00; B26D 5/00; G01B 7/16; B65H 23/18

[52] U.S. Cl. .................................. 382/8; 382/29; 382/34; 83/61; 83/62; 83/73; 83/772; 83/773; 318/503; 318/565; 226/16; 226/33

[58] Field of Search ............... 382/8, 34; 53/498, 500, 53/520, 504

[56] References Cited

U.S. PATENT DOCUMENTS

| | | | |
|---|---|---|---|
| 2,587,631 | 3/1952 | Kuehne | 324/229 |
| 2,700,132 | 1/1955 | Kuehne | 324/34 |
| 2,994,015 | 7/1961 | Eidam | 317/149 |
| 2,994,783 | 8/1961 | Looschen | 250/219 |
| 3,069,601 | 12/1962 | Eidam | 317/149 |
| 3,165,726 | 1/1965 | Riley | 340/259 |
| 3,203,635 | 8/1965 | Rayfield et al. | 242/55.12 |
| 3,323,700 | 6/1967 | Epstein et al. | 226/17 |
| 3,440,909 | 4/1969 | Schmid et al. | 175/183 |
| 3,556,368 | 1/1971 | Rene | 226/11 |
| 3,594,581 | 7/1971 | Yamashita | 250/256 |
| 3,713,571 | 1/1973 | Simonton | 226/2 |
| 3,765,283 | 10/1973 | Murphy | 83/61 |
| 3,786,976 | 1/1974 | Murphy, II | 226/48 |
| 4,019,131 | 4/1977 | Yamada et al. | 324/34 |
| 4,134,486 | 1/1979 | Grone | 198/466 |
| 4,138,709 | 2/1979 | Colwill | 361/180 |
| 4,343,991 | 8/1982 | Fujiwara et al. | 250/227 |
| 4,420,747 | 12/1983 | Kistner | 340/674 |
| 4,484,119 | 11/1984 | Kerr | 318/563 |
| 4,514,641 | 4/1985 | Tanaka et al. | 250/570 |
| 4,533,926 | 8/1985 | Foldvari et al. | 346/136 |
| 4,603,611 | 8/1986 | Ferguson | 83/50 |
| 4,628,578 | 12/1986 | Yajima | 29/407 |
| 4,633,720 | 1/1987 | Dyble et al. | 73/862.53 |
| 4,641,828 | 2/1987 | Yajima | 271/227 |
| 4,673,815 | 6/1987 | Fruth et al. | 250/548 |
| 4,683,380 | 7/1987 | Shipkowski et al. | 250/223 |
| 4,725,961 | 2/1988 | Pearl | 324/34 |
| 4,813,320 | 3/1989 | Malloy et al. | 83/61 |
| 4,908,871 | 3/1990 | Hara et al. | 382/8 |

FOREIGN PATENT DOCUMENTS 1576994 10/1980 United Kingdom .
2108676 7/1986 United Kingdom .

Primary Examiner—Michael Razavi
Assistant Examiner—Daniel Santos
Attorney, Agent, or Firm—Stanley J. Price, Jr.

[57] ABSTRACT

A plurality of individual frames or stampings provided in a sheet strip material by a stamping device are passed in proximity to a sensing device. As each individual frame or stamping is passed in proximity to the sensing device, the sensing device provides a voltage signal to a controller. The voltage signal is proportional to the amount of, or mass of, metallic material in each frame or stamping and the distance between the frame or stamping and the sensing device. The controller generates an individual waveform from the voltage signal for each frame passed in proximity to the sensing device. Each individual waveform is a function of the position of the movable portion of the stamping device for one cycle. As the plurality of individual frames are passed in proximity to the sensing device, a plurality of individual waveforms are generated within the controller. The waveforms are compared within the controller to detect a deviation between waveforms. A deviation between waveforms indicates a sheet strip material misfeed condition within the stamping device. If a sheet strip material misfeed condition is detected, the controller provides a signal to the stamping device to initiate stoppage of the stamping device. If desired, the plurality of individual waveforms may also be compared within the controller to detect a deviation in the configuration of the frames or stampings produced by the stamping device from a desired frame or stamping configuration.

7 Claims, 3 Drawing Sheets

METHOD AND APPARATUS FOR DETECTING A SHEET STRIP MATERIAL MISFEED CONDITION

CROSS REFERENCE TO RELATED APPLICATIONS

This application is a continuation of copending application Ser. No. 084,630, filed on Aug. 11, 1987, entitled "Method And Apparatus For Detecting A Sheet Strip Material Misfeed Condition" now U.S. Pat. No. 4,813,320.

BACKGROUND OF THE INVENTION

1. Field of the Invention

This invention relates to a method and apparatus for monitoring the position of a sheet strip material passed through a stamping device, and more particularly, to a method and apparatus for detecting a sheet strip material misfeed condition within the stamping device as the sheet strip material progresses through the stamping device. This invention also discloses a method and apparatus for detecting the configuration of individual connected stamped items in a strip produced by a stamping device to detect individual stampings having a configuration deviating from a desired stamping configuration.

2. Description of the Prior Art

It is well known in the stamping art to pass a sheet strip material through a stamping device to produce a plurality of individual frames or stampings in the sheet strip material. The individual frames or stampings each have a configuration dependent upon the placement of the various punches in the movable portion of the stamping device. As the sheet strip material is passed through the stamping device, the movable portion of the stamping device is cycled into and out of contact with the sheet strip material to blank stock from the sheet strip material to provide a plurality of individual frames or stampings. After the individual frames exit the stamping device, the individual frames may be separated from one another for further use.

Since the stamping device operates at a high rate of speed, a sheet strip material misfeed condition within the stamping device or other problem that may develop within the stamping device resulting in frames being produced having an undesired configuration are normally undetected unless the stamping device operator shuts the system down and performs a visual inspection of the individual frames or stampings. Generally, by the time the operator stops the stamping device to inspect the individual frames or stampings, the misfeed condition or other problem has resulted in a large number of frames or stampings being produced having an undesirable configuration. These frames or stampings must be removed from the sheet strip material for scrap.

As known in the art, a sheet strip material misfeed condition is identified as any condition, occuring either internally or externally to the stamping device, which prevents the sheet strip material from being at its proper location within the stamping device at any preselected instant of time relative to the movable portion of the stamping device.

In order to provide an early indication of a sheet strip material misfeed condition within the stamping device, various devices have been utilized.

Spring loaded micro-switches or other suitable contact-type switches have been employed internal to the stamping device to provide a material misfeed indication to the stamping device operator if the sheet strip material passing through the stamping device rolls over on itself or buckles within the stamping device. When this roll-over or buckle condition occurs, up to three layers of sheet strip material are provided to the movable punch assembly portion of the stamping device. When this occurs, the movable punch assembly is inhibited in its length of travel and, as a result, the micro-switch is not closed. If the micro-switch fails to close, a signal is provided to notify the stamping device operator of the roll-over or buckle condition. The use of a micro-switch or other mechanical switch internal to the stamping device is undesirable since the micro-switch can only detect a roll-over or buckle condition if the movable portion of the stamping device is inhibited in its full length of travel. In addition, the micro-switch will detect a roll-over or buckle condition only after the roll-over or buckling has occurred. The micro-switch cannot detect other types of misfeed conditions such as a change in the speed of the sheet strip material passing through the stamping device or a momentary jamming of the sheet strip material within the stamping device. In addition, the micro-switch cannot detect other conditions or problems which occur internal to the stamping device which result in individual frames or stampings being produced having a configuration other than the desired configuration.

Therefore, there is a need for a non-contact detection apparatus for use with a stamping device that is capable of detecting a sheet strip material misfeed condition and also capable of detecting a deviation in the configuration of an individual frame or stamping from the desired frame configuration.

Although non-contact detecting devices are commercially available, these non-contact detecting devices are limited in that they only detect the thickness of a sheet strip material, or the presence or absence of a sheet strip material at a preselected location.

U.S. Pat. No. 2,587,631 discloses a method and device adapted to detect magnetic sheets which vary from a predetermined standard of thickness. U.S. Pat. No. 2,700,132 discloses a device for preventing the feeding of more than one thickness of magnetic sheet material into printing, fabricating or other sheet or blank treating machines, and includes an electronic double detector having an electromagnetic detecting head which is disposed in the path of travel of the sheets or blanks.

U.S. Pat. Nos. 2,994,015 and 3,069,601 disclose a magnetic detector for gauging or measuring the thickness of ferro-magnetic sheet material passed in proximity to a pair of magnetic detector heads.

U.S. Pat. No. 4,019,131 discloses a method and apparatus for measuring the shape of the wavy edges of metal strips. The measuring apparatus comprises an electromagnetic induction type non-contacting distance measuring device including a detection coil disposed near the edge of a running metal strip, a filter for deriving out the high frequency component and the low frequency component of the output of the detection coil, and means responsive to the high frequency component for determining the contour of the wavy edge of the strip. The device also includes a means responsive to the low frequency component for adjusting the lateral position of the detection coil with respect to the wavy edge of the metal strip.

U.S. Pat. No. 4,134,486 discloses a workpiece detection circuit in an article handling apparatus for aborting a workpiece from the apparatus whenever an unanticipated workpiece presence or absence is sensed.

U.S. Pat. No. 4,138,709 discloses a proximity switch which is adapted to close a circuit between a source and a load when a metal object is adjacent to the coil in the switch.

U.S. Pat. No. 4,420,747 discloses a sheet feed monitoring system for detecting missing or superimposed sheets fed to a sheet processing machine. The system includes a measuring device for generating signals increasing with the number of superimposed sheets and an evaluating device for emitting an electrical signal when irregularities occur.

While it has been suggested by the prior art devices to utilize contact-type switches to detect a sheet strip material roll-over or buckle condition within the stamping device and to utilize non-contact sensing devices to determine the thickness or presence of a sheet strip material at a preselected location, there is a need for an improved method and apparatus for detecting a sheet strip material misfeed condition within a stamping device as the sheet strip material progresses through the stamping device. The misfeed detection apparatus must be capable of generating a waveform which identifies each individual frame, stamping or stamped item passed through the stamping device. Each waveform identifies an individual frame or stamping as a function of the position of the movable portion of the stamping device. The apparatus must also include means for comparing the plurality of waveforms generated to detect a deviation between waveforms. The deviation between waveforms identifies a material misfeed condition within the stamping device.

In addition to producing an individual waveform for each frame or stamping to detect the presence of a sheet strip material misfeed condition, the apparatus must be capable of being used as a means for detecting the configuration of the individual frames or stampings produced by the stamping device even when no material misfeed condition exists. When used as a frame configuration apparatus, the apparatus generates an individual waveform which identifies the configuration of each frame or stamping produced by the stamping device as a function of the movable portion of the stamping device. The apparatus includes means for selecting a desired waveform identifying a desired frame configuration as a reference waveform. The reference waveform identifying the desired frame configuration is compared to following waveforms to detect a deviation or change in the configuration of at least one individual frame from the desired frame configuration.

When either a material misfeed condition or a frame configuration deviation is detected, the apparatus must be capable of providing a signal to the stamping device to initiate stoppage of the stamping device to allow the material misfeed condition to be corrected or to limit production of individual frames having a configuration deviating from the desired frame configuration.

SUMMARY OF THE INVENTION

In accordance with the present invention there is a provided an apparatus for detecting the configuration of connected stamped items in a metallic strip that includes means for passing the metallic strip having a plurality of connected individual stamped items in proximity to a sensing means. The sensing means produces a sensing means signal as each individual stamped item is passed in proximity to the sensing means. A controller receives the sensing means signal produced as each individual stamped item is passed in proximity to the sensing means. The controller includes means for sampling the sensing means signal to produce an individual waveform for each individual stamped item, and produces a plurality of individual waveforms as the plurality of individual stamped items are passed in proximity to the sensing means. The controller includes means for selecting a desired individual waveform as a reference waveform and comparing each individual waveform to the reference waveform to determine the deviation between any individual waveform and the reference waveform. The deviation between any individual waveform and the reference waveform identifies a change in the configuration of at least one stamped item in the strip material from the desired stamping configuration.

Additionally in accordance with the present invention, there is provided a method for detecting the configuration of individual connected stamped items in a metallic strip comprising the steps of passing a metallic strip including a plurality of individual connected stamped items in proximity to a sensing means to produce a sensing means signal for each individual stamped item passed in proximity to the sensing means. The method includes providing the sensing means signal produced for each individual stamped item to a controller, and sampling the sensing means signal to generate an individual waveform for each individual stamped item. The method includes the further steps of generating within the controller a plurality of individual waveforms as the plurality of individual stamped items are passed in proximity to the sensing means. An individual waveform identifying a desired stamped item configuration is selected as a reference waveform, and each following waveform is compared to the reference waveform to detect a deviation between any individual waveform and the reference waveform. A deviation between a following waveform and the reference waveform identifies a stamped item having a configuration which deviates from the desired frame configuration.

Accordingly, the principal object of the present invention is to provide a method and apparatus for identifying the configuration of individual stamped items in a sheet metallic strip to detect a change or deviation in the configuration of at least one stamped item in the sheet strip material from a desired stamping configuration.

These and other objects of the present invention will be more completely disclosed and described in the following specification, the accompanying drawings and the appended claims.

DESCRIPTION OF THE PREFERRED EMBODIMENTS

Figure 1:
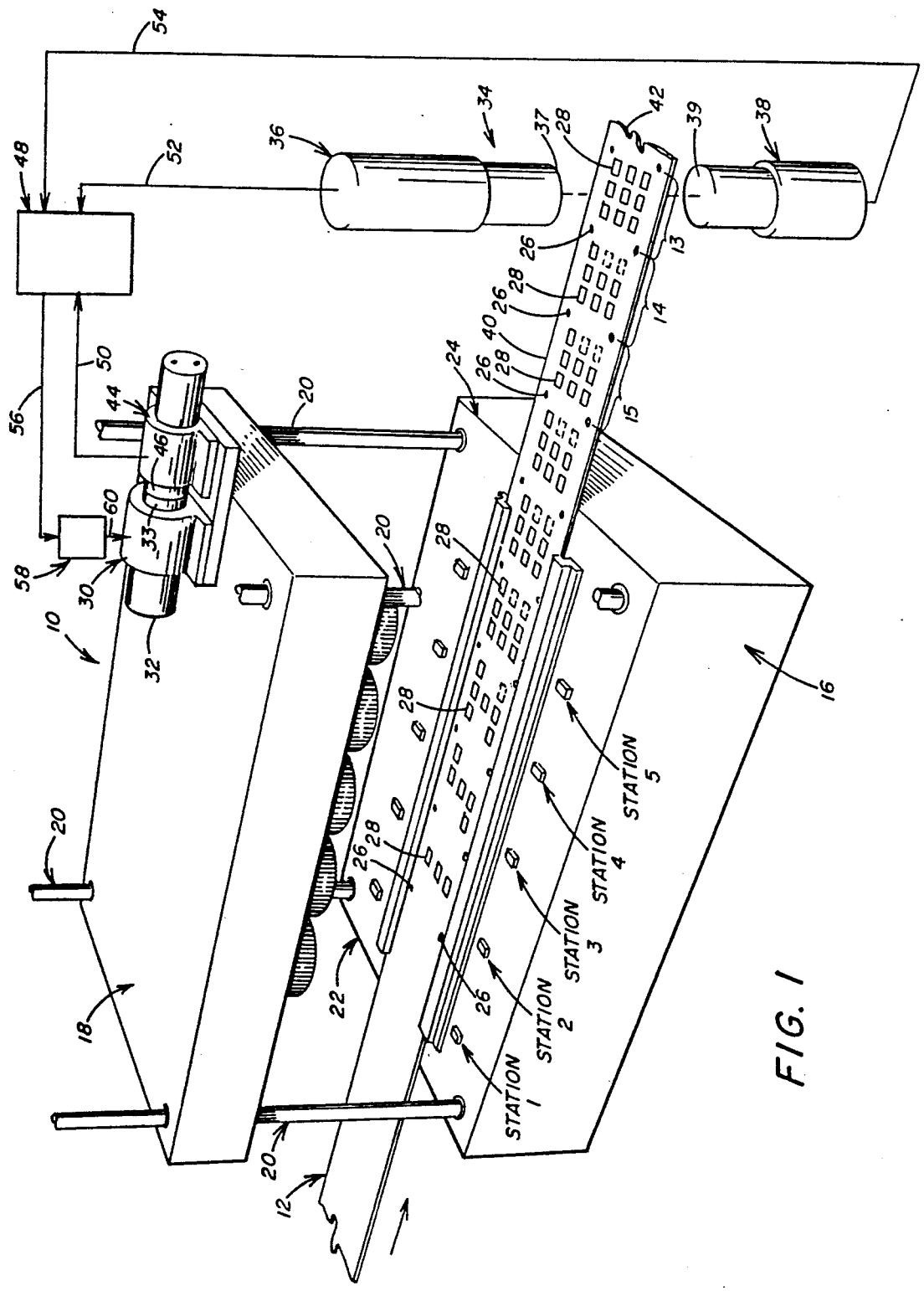
FIG. 1 is an isometric view of a stamping device, illustrating an apparatus for detecting a sheet strip material misfeed condition and the configuration of the individual frames or stampings in the sheet strip material produced by the stamping device.

Referring to the drawings and particularly to FIG. 1, there is illustrated apparatus generally designated by the numeral 10 for stamping in a sheet strip material 12 a plurality of individual stampings or frames such as stampings or frames 13, 14, 15 for purposes well known in the stamping art.

The frames 13, 14 and 15 are intended to illustrate a plurality of connected stamped items 13, 14 and 15 that form a continuous metallic strip 12 of the stamped items. Throughout the specification and claims, the terms "frame", "stamping", "stamped item" and "stamped product" are used interchangeably to designate a continuous strip of connected stamped items which are later separated into individual stamped items.

The stamping apparatus generally designated by the numeral 10 includes a stationary die assembly 16 and a press or punch assembly 18. Punch assembly 18 is positioned above and securely attached to stationary die assembly 16. Punch assembly 18 is mounted for reciprocal vertical movement on stationary die assembly 16 by mounting posts schematically illustrated by the numerals 20.

The stamping apparatus generally designated by the numeral 10 includes an inlet portion 22 and an outlet portion 24. Sheet strip material 12, supplied from a source (not shown), enters stamping apparatus 10 at inlet portion 22. As sheet strip material 12 progresses between stationary die assembly 16 and punch assembly 18 from inlet portion 22 to outlet portion 24, press assembly 18 is reciprocated vertically or cycled into and out of contact with stationary die assembly 16 to progressively stamp in sheet strip material 12 a plurality of stampings or frames such as frames 13, 14, 15. Stamping apparatus 10 includes a plurality of individual stamping stations numbered 1-5. Although five stamping stations are illustrated, it should be understood that stamping apparatus 10 may include any number of stamping stations required to stamp the desired square openings 28 in sheet strip material 12 to produce frames such as frames 13, 14, 15. It should be further understood that the stamping apparatus generally designated by the numeral 10 is itself known in the art and is described herein only as it relates to the present invention.

At station 1, pilot holes 26 are blanked in sheet strip material 12. At stations 2-5, a plurality of square openings 28 are blanked in sheet strip material 12 to provide that, as sheet strip material 12 exits stamping apparatus 10 outlet portion 24, sheet strip material 12 includes a plurality of individual stampings or frames such as frames 13, 14, 15 each having a plurality of square openings 28 blanked therein. It should be understood that the location of each square opening 28 in sheet strip material 12 is dependent upon the position of each individual punch positioned in punch assembly 18 and die positioned in stationary die assembly 16. Stampings or frames 13, 14, 15 may have any desired configuration to meet particular application requirements.

As seen in FIG. 1, a motor 30 is suitably connected to punch assembly 18 to cycle punch assembly 18 into and out of contact with stationary die assembly 16 as motor 30 first shaft 32 rotates. Although the first shaft 32 connection to movable punch assembly 18 is not specifically illustrated in FIG. 1, the connection between first shaft 32 and movable punch assembly 18 is itself well known in the art. As sheet strip material 12 progresses through stamping apparatus 10, the rotational movement of motor 30 first shaft 32 imparts reciprocal vertical movement to punch assembly 18 to drive the plurality of punches positioned in punch assembly 18 at stations 1-5 into and out of contact with sheet strip material 12. In this manner, material stock is blanked from sheet strip material 12 to provide a plurality of individual stampings or frames such as frames 13, 14, 15 in sheet strip material 12. As previously described, the specific locations of the plurality of square openings 28 in sheet strip material 12 are shown in FIG. 1 for illustrative purposes only. Stamping apparatus 10 may be utilized to provide individual stampings or frames such as frames 13, 14, 15 having any preselected configuration selected to suit particular application requirements.

As seen in FIG. 1, motor 30 also includes a second shaft 33. Second shaft 33 is coupled by suitable means to encoder 44 input shaft 46. As motor 30 operates to rotate first shaft 32 at a preselected angular speed and thereby impart reciprocal vertical movement to punch assembly 18, second shaft 33 rotates at the same angular speed to rotate encoder 44 input shaft 46. As is known in the art, encoder 44 produces a plurality of individual, serial pulses as input shaft 46 rotates. A plurality of individual, serial pulses are generated by encoder 44 each time movable punch assembly 18 is cycled into and out of contact with sheet strip material 12 on stationary die assembly 16. As described, each individual encoder pulse identifies a distinct position of punch assembly 18 relative to stationary die assembly 16 for each cycle of movable punch assembly 18. The plurality of encoder pulses generated each time movable punch assembly 18 is cycled into and out of contact with stationary die assembly 16 is referred to as a set, and a plurality of sets of encoder pulses are produced by encoder 44 as movable punch assembly 18 is continuously cycled into and out of contact with stationary die assembly 16.

Each cycle of punch assembly 18 into and out of contact with sheet strip material 12 positioned on stationary die assembly 16 is described herein in terms of angular movement. At 0°, punch assembly 18 is positioned at rest as illustrated in FIG. 1 and is spaced from stationary die assembly 16. At 90°, punch assembly 18 has traveled half the distance between its rest position of 0° and stationary die assembly 16. At 180°, punch assembly 18 contacts sheet strip material 12 and blanks the plurality of individual openings 28 in sheet strip material 12. At approximately 270°, punch assembly 18 has cleared sheet strip material 12, and thereafter punch assembly 18 returns to its rest position of 0°. As soon as punch assembly 18 clears the surface of sheet strip material 12, sheet strip material 12 is advanced between stamping stations. As punch assembly 18 reaches approximately 90°, sheet strip material 12 is stopped in preparation for stamping. After punch assembly 18 blanks sheet strip material 12 and clears the surface of sheet strip material 12, sheet strip material 12 is again advanced between stamping stations. Since encoder 44 produces a plurality of individual encoder pulses each time punch assembly 18 is cycled into and out of contact with sheet strip material 12, each distinct position of punch assembly 18 in any given cycle may be identified by an individual encoder pulse.

As described, each distinct position of punch assembly 18 from a rest position of 0° through the blanking position of 90° and back to the rest position of 0° is identified by an individual encoder pulse produced by encoder 44. As will be described later in greater detail, the plurality of encoder pulses produced by encoder 44 for each stamping cycle are provided to a controller.

In order to detect a sheet strip material 12 misfeed condition in stamping apparatus 10, sheet strip material 12 including the plurality of individual frames 13, 14, 15 exits stamping apparatus 10 at outlet portion 24 and is passed in proximity to a sensing station generally designated by the numeral 34. The sensing station generally designated by the numeral 34 includes an upper proximity sensor 36 positioned a fixed preselected distance above a common top surface 40 of frames 13, 14, 15 and a lower proximity sensor 38 positioned a fixed preselected distance beneath a common bottom surface 42 of frames 13, 14, 15. As seen in FIG. 1, frames 13, 14, 15 are passed between upper proximity sensor 36 and lower proximity sensor 38. Although the upper and lower proximity sensors 36, 38 illustrated in FIG. 1 are spaced from stamping apparatus 10 outlet portion 24, it should be understood that upper and lower proximity sensors 36, 38 may be mounted within stamping apparatus 10 at outlet portion 24 without departing from this invention.

Upper proximity sensor 36 includes a circular head portion 37, and lower proximity sensor 38 includes a circular head portion 39. Upper proximity sensor 36 is positioned a fixed preselected distance above common top surface 40 so that circular head portion 37 is substantially parallel to common top surface 40. In like manner, lower proximity sensor 38 is positioned a fixed preselected distance beneath common bottom surface 42 so that circular head portion 39 is substantially parallel to common bottom surface 42. As described, upper proximity sensor 36 circular head portion 37 is substantially parallel to lower proximity sensor 38 circular head portion 39. In addition, circular head portion 37 is spaced from and positioned directly above circular head portion 39.

Although sensing station 34 in FIG. 1 illustrates upper proximity sensor 36 and lower proximity sensor 38, it should be understood that, if desired, only one proximity sensor need be utilized. The pair of proximity sensors 36, 38 are utilized to compensate for vibration as frames 13, 14, 15 exit stamping apparatus 10 at outlet portion 24. However, if desired, either upper proximity sensor 36 or lower proximity sensor 38 may be utilized singularly without departing from this invention.

Upper proximity sensor 36 and lower proximity sensor 38 illustrated in FIG. 1 are standard, commercially obtainable proximity devices known in the art. Proximity devices such as sensors 36, 38 each include an internal coil (not shown) which generates an electromagnetic flux field as current is passed through the coil. By bringing metallic material such as sheet strip material 12 including frames 13, 14, 15 into contact with this flux field, each sensor produces an output voltage proportional to the amount of, or mass of, metallic material brought into contact with the flux field and the distance between the metallic material and the proximity sensor head. It is known that as the amount of metallic material brought into contact with the flux field varies, the output voltage of the proximity sensor proportionately varies.

As each of the frames 13, 14, 15 are passed in succession between upper and lower proximity sensors 36, 38, individual voltage signals proportional to the amount of metallic material in frames 13, 14, 15 are produced by sensors 36, 38 and provided to a controller 48 on lines 52, 54 respectively. The individual voltage signals are averaged within controller 48 to produce an "average" voltage signal for each of the frames 13, 14, 15. Since each of the frames 13, 14, 15 include a plurality of blanked openings 28, the voltage signals produced by sensors 36, 38 as each of the frames 13, 14, 15 are passed in succession between sensors 36, 38 will have a magnitude which varies.

The voltage signals provided to controller 48 by upper and lower proximity sensors 36, 38 for each frame 13, 14, 15 passed between upper and lower proximity sensors 36, 38 are averaged within controller 48 to provide an "average" voltage signal, and controller 48 samples or reads the magnitude of the "average" voltage signal each time an individual encoder pulse produced by encoder 44 is received by controller 48 on line 50. For example, if encoder 44 provides 1,024 individual serial encoder pulses to controller 48 for each cycle of punch assembly 18 into and out of contact with stationary die assembly 16, controller 48 will sample or read the magnitude of the "average" voltage signal 1,024 times per cycle. As described, as each frame 13, 14, 15 is successively passed between upper and lower proximity sensors 36, 38, controller 48 takes 1,024 "average" voltage signal readings. Further, each of the 1,024 individual "average" voltage signal readings identifies a distinct position of punch assembly 18 relative to stationary die assembly 16 for each cycle.

The plurality of "average" voltage signals provided to controller 48 for each cycle of punch assembly 18 are processed within controller 48 to generate an individual waveform. Each waveform generated within controller 48 is a plot of the "average" voltage signal sampled versus the distinct positions of movable punch assembly 18 relative to stationary die assembly 16 for each cycle of punch assembly 18. In other words, as individual frame 13 is passed between upper and lower proximity sensors 36, 38, an individual waveform is produced within controller 48 which plots the position of movable punch assembly 18 relative to stationary die assembly 16 for one cycle versus the plurality of "average" voltage signals sampled for one cycle. As described, as individual frames 13, 14, 15 are passed between upper and lower proximity sensors 36, 38, three individual waveforms are generated within controller 48. Although reference is made herein to three individual waveforms corresponding to frames 13, 14, 15, it should be understood that a separate waveform is produced within controller 48 for every individual frame passed between upper and lower proximity sensors 36, 38.

In order to determine whether a material misfeed condition has occurred within stamping apparatus 10, the waveforms generated within controller 48 plotting movable punch assembly 18 position per cycle versus "average" voltage signal sampled per cycle are compared within controller 48. It should be understood that as long as no material misfeed condition occurs within stamping apparatus 10, each of the waveforms produced by controller 48 will have a substantially identical configuration. As long as the normal progress of sheet strip material 12 through stamping apparatus 10 is uninhibited for each cycle of punch assembly 18 into and out of contact with stationary die assembly 16, the progress of each of the completed frames such as frames 13, 14, 15 passing between upper and lower proximity sensors 36, 38 will also be uninhibited. As a result, for any given distinct position of punch assembly 18 relative to stationary die assembly 16 per cycle, frames 13, 14, 15 will be positioned at the same relative location between sensors 36, 38. For example, if no material misfeed condition occurs within stamping apparatus 10, as punch assembly 18 cycles between 270° and 90°, frame 13 will pass between sensors 36, 38 and controller 48 will generate a waveform plotting the position of punch assembly 18 versus the "average" voltage signal sampled for frame 13. As punch assembly 18 reaches approximately 90° in its cycle, sheet strip material 12 is stopped to allow punch assembly 18 to blank a plurality of square openings 28 in sheet strip material 12. When punch assembly 18 clears the surface of sheet strip material 12, sheet strip material 12 is again advanced and frame 14 passes between upper and lower sensors 36, 38. As frame 14 passes between sensors 36, 38, controller 48 generates a waveform plotting the position of punch assembly 18 versus the "average" voltage signal sampled for frame 14. If no material misfeed condition occurs, a comparison of the waveforms generated by controller 48 for frames 13, 14 show that, for any distinct position of punch assembly 18 relative to stationary die assembly 16, the magnitudes of the "average" voltage signals for frames 13, 14 will be substantially identical.

However, if a material misfeed condition does occur which inhibits the normal progress of sheet strip material 12 through stamping apparatus 10, the waveform generated by controller 48 as the misfeed condition occurs will deviate from the waveforms generated prior to the misfeed condition.

Figure 2:
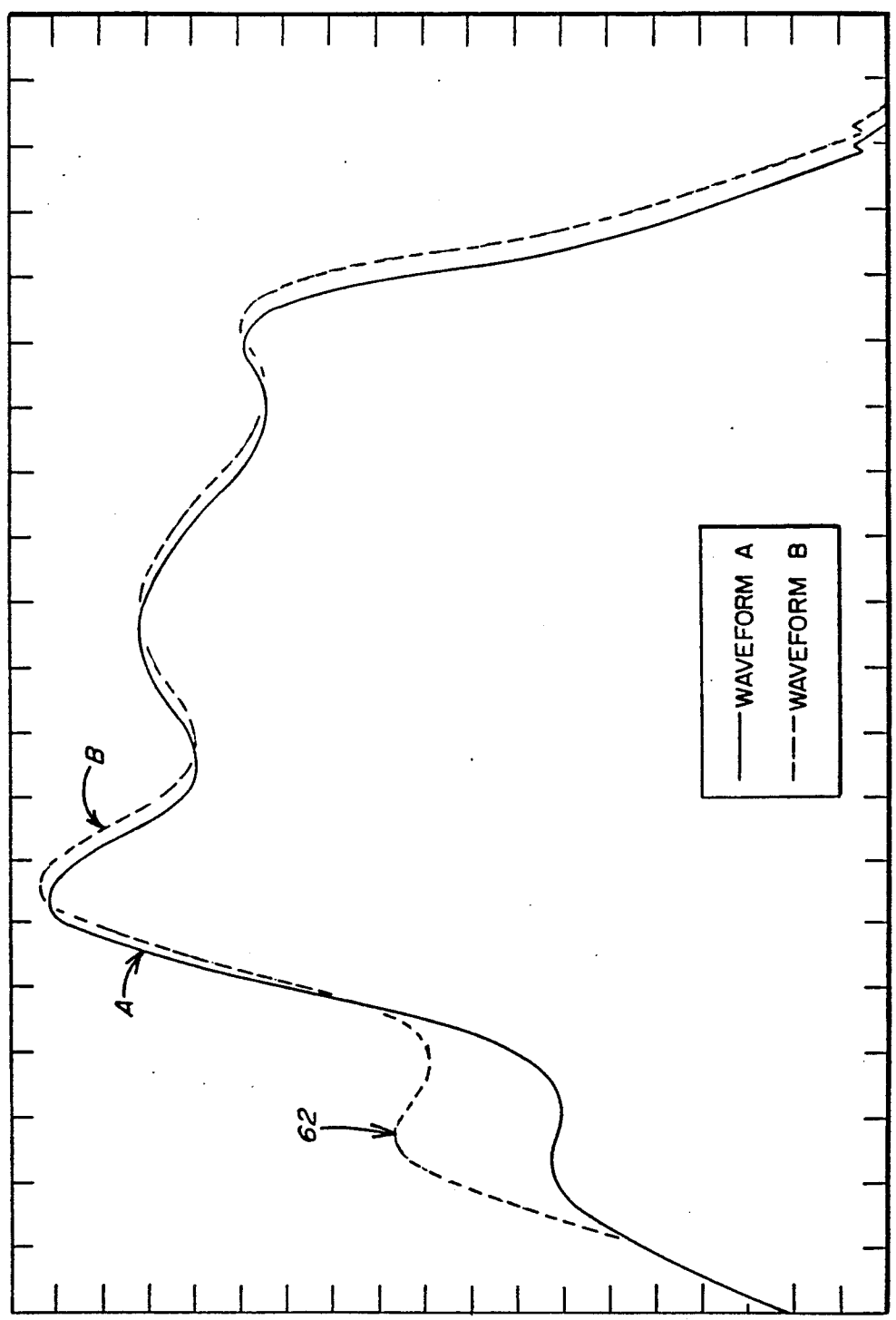
FIG. 2 illustrates a controller-generated waveform which identifies an individual frame as a function of stamping device punch assembly position, and a waveform generated by the controller as a result of a sheet strip material misfeed condition within the stamping device.

Referring to FIG. 2, there are illustrated a pair of waveforms A and B generated by controller 48. The waveform vertical axis identifies the distinct positions of movable punch assembly 18 relative to stationary die assembly 16 for one cycle of movable punch assembly 18. The waveform horizontal axis is a plot of the "average" voltage signal sampled or read by controller 48 for one cycle of punch assembly 18. As seen, each distinct position of movable punch assembly 18 relative to stationary die assembly 16 has a corresponding voltage magnitude. Waveform A is generated within controller 48 as frame 13 is passed between upper and lower proximity sensors 36, 38. Waveform B is generated within controller 48 as individual frame 14 is passed between upper and lower proximity sensors 36, 38. As previously described, if no material misfeed condition occurs within stamping apparatus 10, waveforms A and B should have a substantially identical configuration.

However, comparing waveforms A and B in FIG. 2 illustrates that waveform B includes an error portion 62. Error portion 62 provides an indication that a misfeed condition occurred within stamping apparatus 10 as individual frame 14 passed between upper and lower proximity sensors 36, 38.

Error portion 62 indicates that sheet strip material 12 may have momentarily jammed within stamping apparatus 10, the speed of the sheet strip material 12 passing through stamping apparatus 10 may have momentarily varied, or sheet strip material 12 may have partially folded over or buckled within stamping apparatus 10.

Within controller 48, waveforms A and B are compared to each other to determine whether the configuration of waveform B varies from the configuration of waveform A. A variation in the configuration of waveform B, illustrated by error portion 62, indicates a material misfeed condition within stamping apparatus 10. When the deviation between waveform A and waveform B is detected within controller 48, controller 48 provides an error signal on line 56 to motor controller 58. When motor controller 58 receives this error signal from controller 48, motor controller 58 interrupts the voltage provided to motor 30 on line 60 to initiate stoppage of stamping apparatus 10. As described, the voltage to motor 30 is interrupted to initiate stoppage of stamping apparatus 10 as soon as a material misfeed condition is detected within stamping apparatus 10.

In addition to detecting a sheet strip material 12 misfeed condition within stamping apparatus 10, it has been found that the sensing station 34 illustrated in FIG. 1 may also be operated in conjunction with encoder 44 and controller 48 to detect the configuration of individual frames produced by stamping apparatus 10 and determine the deviation between the configuration of any frame produced and the desired frame configuration.

As previously described in discussing FIG. 1, individual frames such as frames 13, 14, 15 are passed between upper and lower proximity sensors 36, 38 to provide a pair of individual voltage signals to controller 48 on lines 52, 54 respectively. The voltage signals provided by sensors 36, 38 are averaged within controller 48 to produce an "average" voltage signal for each of the frames 13, 14, 15. The voltage signals provided to controller 48 from proximity sensors 36, 38 on lines 52, 54, respectively are proportional to the amount of, or mass of, metallic material in frames 13, 14, 15 passed between sensors 36, 38 and the distance between frames 13, 14, 15 and sensors 36, 38. For example, as frame 13 is passed between upper and lower proximity sensors 36, 38, a pair of individual voltage signals are supplied from sensors 36, 38 to controller 48 which are proportional to the amount of metallic material in frame 13. As seen in FIG. 1, frame 13 includes nine square openings 28 blanked completely through frame 13 from top surface 40 to bottom surface 42. As frame 13 having nine square openings 28 is passed between upper and lower proximity sensors 36, 38, the absence of metallic material due to the nine square openings 28 will be detected by sensors 36, 38. This absence of metallic material at each of the square openings 28 in frame 13 will result in a variation of the voltage signals produced by sensors 36, 38 and provided to controller 48.

An individual waveform is generated by controller 48 from the "average" voltage signal sampled by controller 48 as frame 13 is passed between upper proximity sensor 36 and lower proximity sensor 38. As previously described for the sheet strip material 12 misfeed condition, controller 48 samples the "average" voltage signal each time an encoder pulse is received by controller 48 from encoder 44. In this manner, each waveform is a function of the position of punch assembly 18 relative to stationary die assembly 16 for each cycle of punch assembly 18.

As individual frames 13, 14, 15 are passed between upper and lower proximity sensors 36, 38, three individual waveforms are generated within controller 48. The three individual waveforms identify the configuration of individual frames 13, 14, 15. Although three individual waveforms corresponding to the configurations of frames 13, 14, 15 are described herein, it should be understood that a waveform is generated within controller 48 for every individual frame passed between upper and lower proximity sensors 36, 38.

In order to utilize sensing station 34 to detect the configuration of individual frames produced by stamping apparatus 10 and to determine the deviation between the configuration of any frame produced and the desired frame configuration, sheet strip material 12 is first passed through stamping apparatus 10 to stamp a plurality of individual frames in sheet strip material 12. Stamping apparatus 10 is stopped, and the plurality of individual frames are thereafter inspected by operating personnel. If the last frame stamped has the desired frame configuration, the operator programs controller 48 to generate a reference waveform for the next frame passed in proximity to sensors 36, 38. A frame having the desired configuration is identified as a frame having metallic material blanked therefrom at desired locations in the frame so that the frame may be used for its intended purpose.

If the frames inspected have the desired configuration, and frame 13 is the next frame to be passed in proximity to sensors 36, 38, the waveform generated within controller 48 as frame 13 is passed between upper and lower proximity sensors 36, 38 will be stored within controller 48 as the reference waveform.

As frames 14 and 15 are passed in succession between upper and lower proximity sensors 36, 38, the individual waveforms produced for frames 14 and 15 are compared within controller 48 to the reference waveform. Any deviation between the reference waveform generated by controller 48 for frame 13 and the waveforms generated for frames 14 or 15 indicates an undesired configuration of either frame 14 or frame 15. When the deviation between the reference waveform and any following individual waveform is detected within controller 48, controller 48 provides an error signal on line 56 to motor controller 58. When motor controller 58 receives this error signal from controller 48, motor controller 58 interrupts the voltage provided to motor 30 on line 60 to initiate stoppage of stamping apparatus 10.

In order to detect individual frames having a configuration deviating from the desired configuration, sheet strip material 12 is first fed from a supply coil or other supply (not shown) to stamping apparatus 10. Within stamping apparatus 10, material stock is blanked at preselected locations in sheet strip material 12 to provide individual frames such as frames 13, 14, 15, each having a configuration illustrated in FIG. 3. The various square openings 28 are blanked in sheet strip material 12 at stations 1-5 of stamping apparatus 10 in preselected locations depending on specific application requirements. As previously described, individual frames 13, 14, 15 may have any desired configuration, and the plurality of individual square openings 28 blanked in sheet strip material 12 are herein shown for illustrative purposes only.

The individual frames 13, 14, 15 produced by stamping apparatus 10 are passed in succession between upper and lower proximity sensors 36, 38. As each of the individual frames 13, 14, 15 are passed between upper and lower proximity sensors 36, 38, a pair of individual voltage signals are provided by upper and lower proximity sensors 36, 38 to controller 48 on lines 52, 54, and averaged within controller 48 to provide an "average" voltage signal. As previously described for the sheet strip material misfeed condition controller 48 samples or reads the magnitude of the "average" voltage signal as each individual encoder pulse is received by controller 48 from encoder 44. In this manner, controller 48 generates an individual waveform for each frame 13, 14, 15.

The waveforms generated within controller 48 identifying the configuration of individual frames 13, 14, 15 each plot the position of punch assembly 18 relative to stationary die assembly 16 versus the "average" voltage signals provided by upper and lower proximity sensors 36, 38.

Figure 3:
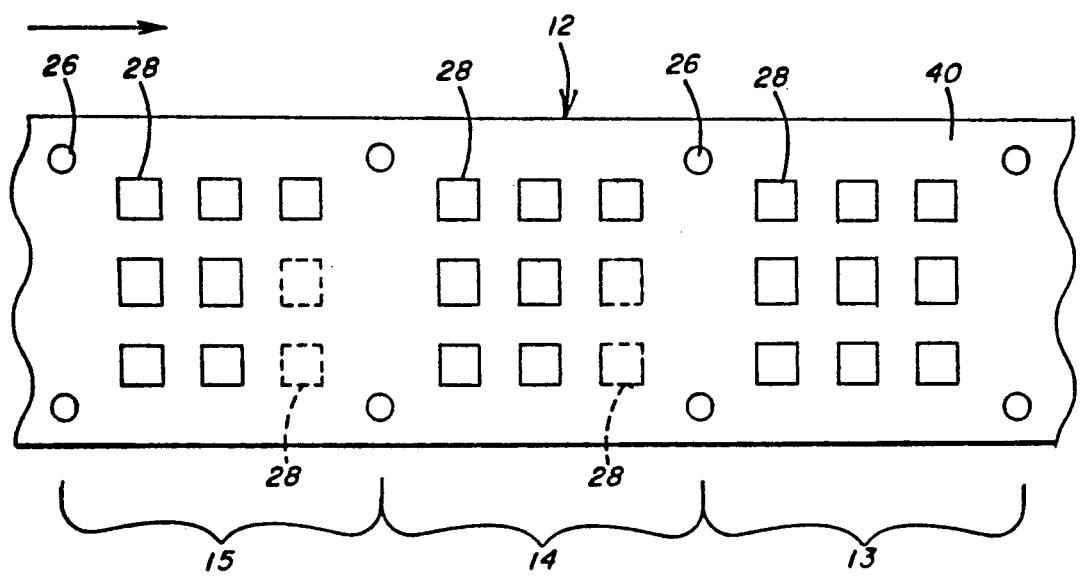
FIG. 3 is an enlarged top plan view of three individual frames stamped in a sheet strip material.

As previously described, if the individual frames inspected have the desired frame configuration, and the frame 13 is the next frame to pass between upper and lower proximity sensors 36, 38, the waveform generated within controller 48 as frame 13 is passed between upper and lower proximity sensors 36, 38 will be stored within controller 48 as the reference waveform. The voltage signals provided by upper and lower proximity sensors 36, 38 to controller 48 as frame 13 is passed between sensors 36, 38 are proportional to the sensing distances between the respective proximity sensors 36, 38 and top surface 40 and bottom surface 42 of individual frame 13; and the amount of, or mass of, metallic material in frame 13. As seen in FIG. 3, individual frame 13 consists of a portion of sheet strip material 12 having nine individual square openings 28 blanked therein.

As individual frame 14 is passed between upper and lower proximity sensors 36, 38, a pair of individual voltage signals are also provided to controller 48. Within controller 48, an individual waveform is generated identifying to the configuration of individual frame 14. As seen in FIG. 3, individual frame 14 includes only seven square openings 28. Two square openings 28 are illustrated in phantom in frame 14 to indicate a possible malfunction in either stationary die assembly 16 or punch assembly 18 such that the dotted individual square openings 28 are not blanked in sheet strip material 12 for frame 14.

Since individual frame 14 includes only seven square openings, the amount of, or mass of, metallic material passed between proximity sensors 36, 38 for frame 14 is less than the amount of, or mass of, metallic material passed between sensors 36, 38 for frame 13. The voltage signals provided by upper and lower proximity sensors 36, 38 to controller 48 for frame 14 are processed within controller 48 to produce an individual waveform identifying the configuration of individual frame 14.

In a similar manner, the sensing means also detects the integrity of a frame or stamped item. As previously stated, the sensing means detects a buckle or double layer of material in the strip and also will detect a prong stamped in the stamped item that is angularly positioned to the plane of the stamped item. The angularly positioned portion of the stamped item will provide a waveform sensing additional metal because of the angularity of the prong or prongs. The absence or presence of the angularly displaced prong and therefore its integrity is thus sensed by the sensing means and the resulting waveform.

The reference waveform identifying the configuration of frame 13 and the waveform identifying the configuration of frame 14 are compared within controller 48. As seen in FIGS. 1 and 3, since individual frame 14 includes only seven square openings 28, the configuration of individual frame 14 deviates from the configuration of frame 13. Controller 48 compares the magnitude of the "average" voltage signal at each position of punch assembly 18 for the waveform identifying the configuration of frame 13 to the magnitude of the "average" voltage signal at each position of punch assembly 18 for the waveform identifying the configuration of frame 14. A comparison by controller 48 of the reference waveform identifying the configuration of frame 13 and the waveform identifying the configuration of frame 14 will detect the absence of the two square openings 28 in frame 14 which were not blanked. As the deviation between waveforms is detected within controller 48, controller 48 provides an error signal on line 56 to motor controller 58 to interrupt the voltage supplied to motor 30 and thereby initiate stoppage of stamping apparatus 10.

As described, upper and lower proximity sensors 36, 38 illustrated in FIG. 1 may be utilized to detect the presence of a sheet strip material 12 misfeed condition within stamping apparatus 10 and also to provide an indication that individual frames produced by stamping apparatus 10 have a configuration which deviates from the desired frame configuration.

According to the provisions of the patent statutes, we have explained the principal, preferred construction and mode of operation of our invention and have illustrated and described what we now consider to represent its best embodiments. However, it should be understood that within the scope of the appended claims, the invention may be practiced otherwise than as specifically illustrated and described herein.

We claim:

1. An apparatus for continuously detecting the configuration of connected stamped items in a metallic strip comprising,
    sensing means,
    means for passing a metallic strip comprising a plurality of connected individual stamped items in proximity to said sensing means,
    said sensing means producing a sensing means signal as each said individual metallic stamped item in said strip is passed in proximity to said sensing means, and
    controller means having an input for receiving said sensing means signal produced as each said individual metallic stamped item in said strip is passed in proximity to said sensing means,
    said controller means including means for sampling said sensing means signal to produce an individual waveform for each said metallic stamped item in said strip, said controller means producing a plurality of individual waveforms as said plurality of individual metallic stamped items in said strip are passed in proximity to said sensing means,
    said controller means including means for selecting a desired individual waveform as a reference waveform and comparing each said individual waveform to said reference waveform to determine the deviation between any said individual waveform and said reference waveform and the integrity of each of said stamped items in said strip.

2. An apparatus for continuously detecting the configuration of stamped items in a metallic strip as set forth in claim 1 in which,
    said reference waveform identifies a desired stamped item configuration, and
    said deviation between any said individual waveform and said reference waveform identifies a change in the configuration of at least one of said stamped items in said metallic strip from said desired stamped item configuration.

3. Apparatus for continuously detecting the configuration of stamped items in a metallic strip as set forth in claim 1 in which,
    said sensing means producing a sensing means signal of the presence or absence of non-planar portions of said stamped items.

4. Apparatus for continuously detecting the configuration of stamped items in a metallic strip material as set forth in claim 1 in which,
    said sensing means signal produced by said sensing means for each said stamping includes a voltage signal having a magnitude proportional to the mass of metallic material in said individual stamped items.

5. A method for continuously detecting the configuration of stamped items in a metallic strip comprising the steps of,
    passing a metallic strip comprising a plurality of individual connected stamped items in proximity to a sensing means,
    producing a sensing means signal as each said individual stamped items in said metallic strip are passed in proximity to said sensing means,
    providing said sensing means signal produced as each of said individual stamped item in said metallic strip is passed in proximity to said sensing means to a controller means,
    sampling said sensing means signal within said controller means to produce an individual waveform from said sensing means signal for each said stamped items in said metallic strip,
    producing in said controller means a plurality of individual waveforms as said plurality of individual stamped items in said metallic strip are passed in proximity to said sensing means,
    selecting a desired individual waveform as a reference waveform, and
    comparing each said individual waveform to said reference waveform to determine the deviation between any said individual waveform and said reference waveform and the integrity of each of said stamped items in said strip.

6. A method for continuously detecting the configuration of stamped items in a metallic strip as set forth in claim 5 including the further steps of,
    selecting said desired waveform to identify a desired configuration, and
    comparing each said individual waveform to said reference waveform to determine said deviation between any said individual waveform and said reference waveform, said deviation identifying a change in the configuration of at least one said stamped items in said metallic strip from said desired stamped configuration.

7. A method for continuously detecting the configuration of stamped items in a metallic strip as set forth in claim 5 including,
    producing a sensing means signal of the presence or absence of non-planar portions of each of said stamped items.

* * * * *